(12) United States Patent
Youssef (10) Patent No.: US 11,709,378 B2
(45) Date of Patent: Jul. 25, 2023

(54) IQ MATCHING CIRCUIT FOR CONTACT LENS RADIO RECEIVER

(71) Applicant: Tectus Corporation, Saratoga, CA (US)

(72) Inventor: Shadi Youssef, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 267 days.

(21) Appl. No.: 17/204,761

(22) Filed: Mar. 17, 2021

(65) Prior Publication Data

US 2022/0299797 A1    Sep. 22, 2022

(51) Int. Cl.
  *G02C 11/00*    (2006.01)
  *G02C 7/04*    (2006.01)

(52) U.S. Cl.
  CPC .............. *G02C 7/049* (2013.01); *G02C 7/047* (2013.01); *G02C 11/10* (2013.01)

(58) Field of Classification Search
  CPC . G02C 7/049; G02C 7/04; G02C 7/02; G02C 7/047; G02C 11/10; G02C 11/00
  USPC ..................................................... 351/159.02
  See application file for complete search history.

(56) References Cited

U.S. PATENT DOCUMENTS

| | | | |
|---|---|---|---|
| 7,545,857 B2 | 6/2009 | Liu | |
| 7,546,100 B2 | 6/2009 | Zachan | |
| 7,684,777 B2 | 3/2010 | Lewis | |
| 8,608,310 B2* | 12/2013 | Otis | ............ H01L 31/0682 351/219 |
| 8,923,777 B2 | 12/2014 | Nezhad-Ahmadi et al. | |
| 10,288,909 B1* | 5/2019 | Youssef | ............ H04B 1/48 |
| 10,409,092 B1* | 9/2019 | Youssef | ............ H04B 1/385 |
| 10,411,745 B1 | 9/2019 | Huang | |
| 2004/0091053 A1 | 5/2004 | Bargroff | |
| 2012/0245444 A1* | 9/2012 | Otis | ............ G01N 27/3272 600/345 |
| 2017/0042480 A1* | 2/2017 | Gandhi | ............ A61B 5/14546 |

OTHER PUBLICATIONS

CMOS Mixers and Polyphase Filters for Large Image Rejection, Behbahani et al., IEEE Journal of Solid-State Circuits, vol. 36, No. 6, Jun. 2001, p. 873.
CMOS Passive Polyphase Filter Design for 2.4 GHz Wireless Communication Applications, Haddad et al., Joint 6th International IEEE Northeast Workshop on Circuits and Systems and TAISA Conference, Montreal, Canada, 2008, 4 pages.
(Continued)

*Primary Examiner* — William R Alexander
(74) *Attorney, Agent, or Firm* — Lewis Roca Rothgerber Christie LLP (57) ABSTRACT

An electronic contact lens. In some embodiments, the electronic contact lens includes a radio antenna and radio receiver contained within the contact lens, the receiver comprising antenna impedance matching and in-phase and quadrature signal generation such that signals from the antenna are projected into in-phase and quadrature components before mixing with a local oscillator signal in the receiver. The electronic contact lens may further include electronic circuits contained within the contact lens, the electronic circuits receiving data from the radio receiver.

20 Claims, 6 Drawing Sheets

(56) References Cited

OTHER PUBLICATIONS 0.13-um CMOS Phase Shifters for X-, Ku-, and K-Band Phased Arrays, Koh et al., IEEE Journal of Solid-State Circuits, vol. 42, No. 11, Nov. 2007, p. 2535.

LNA and Mixer Designs for Multi-Band Receiver Front-Ends, N. Poobuapheun, Ph.D. thesis, University of California, Berkeley, 2009, 214 pages.

Ultra-Low Power Wake-Up Receivers Using N-Path Filtering Techniques, C. Gutierrez, Ph.D. thesis, L'Universite de Lille 1, 2015, 171 pages.

Ka/Ku-Band pHEMT Gilbert Mixers With Polyphase and Coupled-Line Quadrature Generators, Su et al., IEEE Transactions on Microwave Theory and Techniques, vol. 57, No. 5, May 2009, p. 1063.

T. Zhang, M. Taghivand and J. C. Rudell, "A 55-70GHz two-stage tunable polyphase filter with feedback control for quadrature generation with <2° and <0.32dB phase/amplitude imbalance in 28nm CMOS process," ESSCIRC Conference 2015—41st European Solid-State Circuits Conference (ESSCIRC), Graz, Austria, 2015, pp. 60-63, doi: 10.1109/ESSCIRC.2015.7313828.

T. Zhang, V. Subramanian, M. K. Ali and G. Boeck, "Integrated K-Band CMOS passive mixers utilizing balun and polyphase filters," 2011 IEEE International Symposium on Radio-Frequency Integration Technology, Beijing, China, 2011, pp. 89-92, doi: 10.1109/RFIT.2011.6141778.

K. T. Christensen, "LC quadrature generation in integrated circuits," ISCAS 2001. The 2001 IEEE International Symposium on Circuits and Systems (Cat. No.01CH37196), Sydney, NSW, Australia, 2001, pp. 41-44 vol. 1, doi: 10.1109/ISCAS.2001.921783.

Chung-Yun Chou and Chung-Yu Wu, "The design of wideband and low-power CMOS active polyphase filter and its application in RF double-quadrature receivers," in IEEE Transactions on Circuits and Systems I: Regular Papers, vol. 52, No. 5, pp. 825-833, May 2005, doi: 10.1109/TCSI.2005.846672.

\* cited by examiner

FIG. 4

IQ MATCHING CIRCUIT FOR CONTACT LENS RADIO RECEIVER

FIELD

One or more aspects of embodiments according to the present disclosure relate to electronic contact lenses, and more particularly to receiver circuits for such contact lenses.

BACKGROUND

In an electronic contact lens, power may be scarce, in part because in the contact lens the volume available for batteries is limited. In some modes of operation, the contact lens may receive data, in the form of a modulated radio signal, from a transmitter external to the contact lens. Demodulating such a radio signal may involve quadrature demodulation using a quadrature local oscillator signal, the generation of which may consume a significant amount of power.

Thus, there is a need for a receiver capable of receiving a modulated radio signal in a power-efficient manner.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
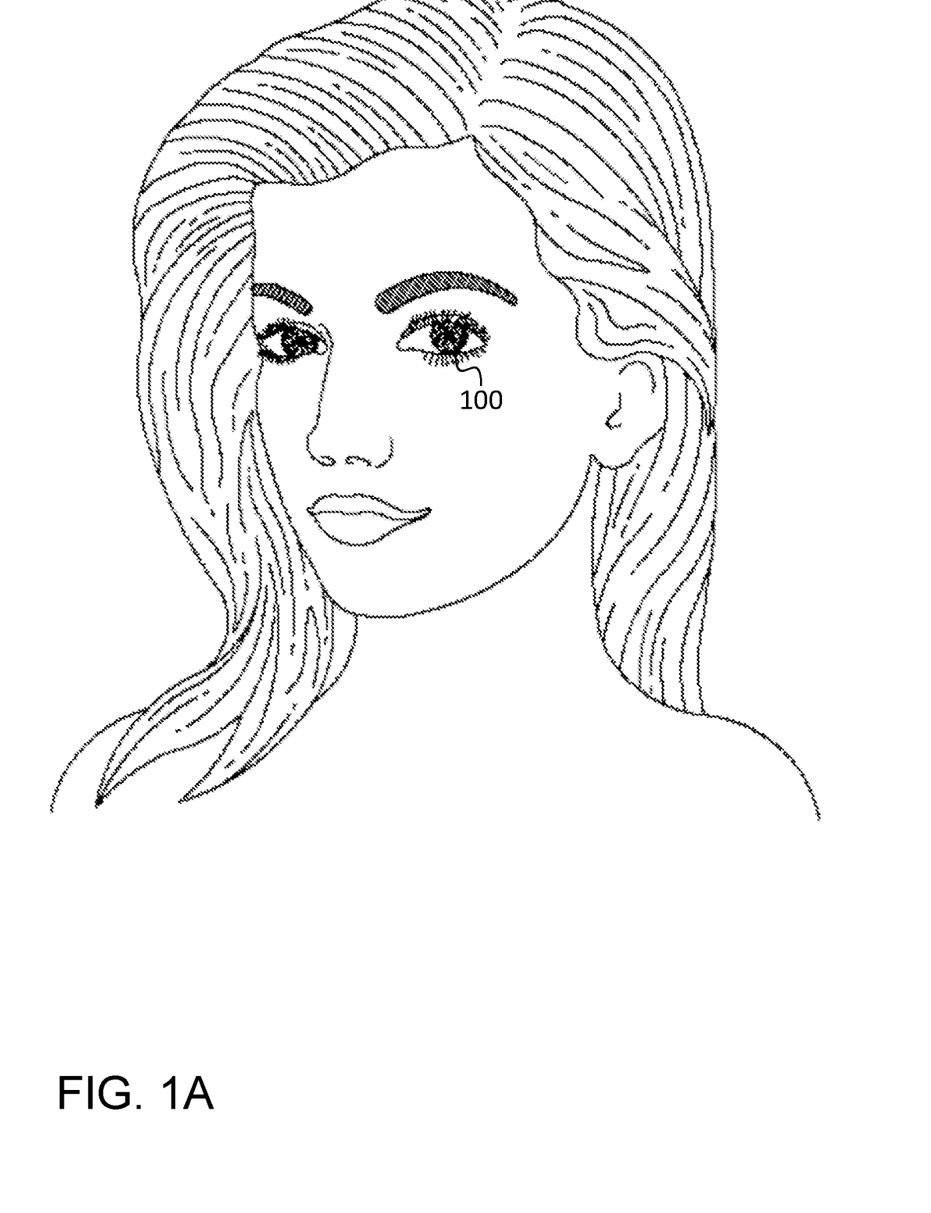
FIG. 1A is an illustration of a wearer wearing electronic contact lenses, according to an embodiment of the present disclosure.

FIG. 1A shows a wearer wearing an electronic contact lens 100. The electronic contact lens 100 may include various electronic components, such as a display, a forward-looking imager, motion sensors (such as a gyroscope, an accelerometer, and a magnetometer, the combination of which may be referred to as an inertial measurement unit (IMU)), a radio (e.g., a 5-GHz radio transceiver) including an antenna, a lens controller, batteries, and a power supply circuit. The electronic contact lens 100 may have various functions; for example, (i) it may project images or text onto the wearer's retina, causing the wearer to see the projected images (e.g., augmented reality video) or text superimposed on the external scene the wearer is viewing (or only the projected images or text, if the wearer's eyes are closed), or (ii) it may assist a wearer with low vision, using the forward-looking imager. The sensors in the electronic contact lens 100 (e.g., the IMU and the forward-looking imager) may be used to track the wearer's eye movements, so that the displayed images and text may appear, to the wearer, to be stationary, as the wearer's eyes move. In some circumstances, it may be advantageous for the wearer to wear two electronic contact lenses 100.

Figure 1B:
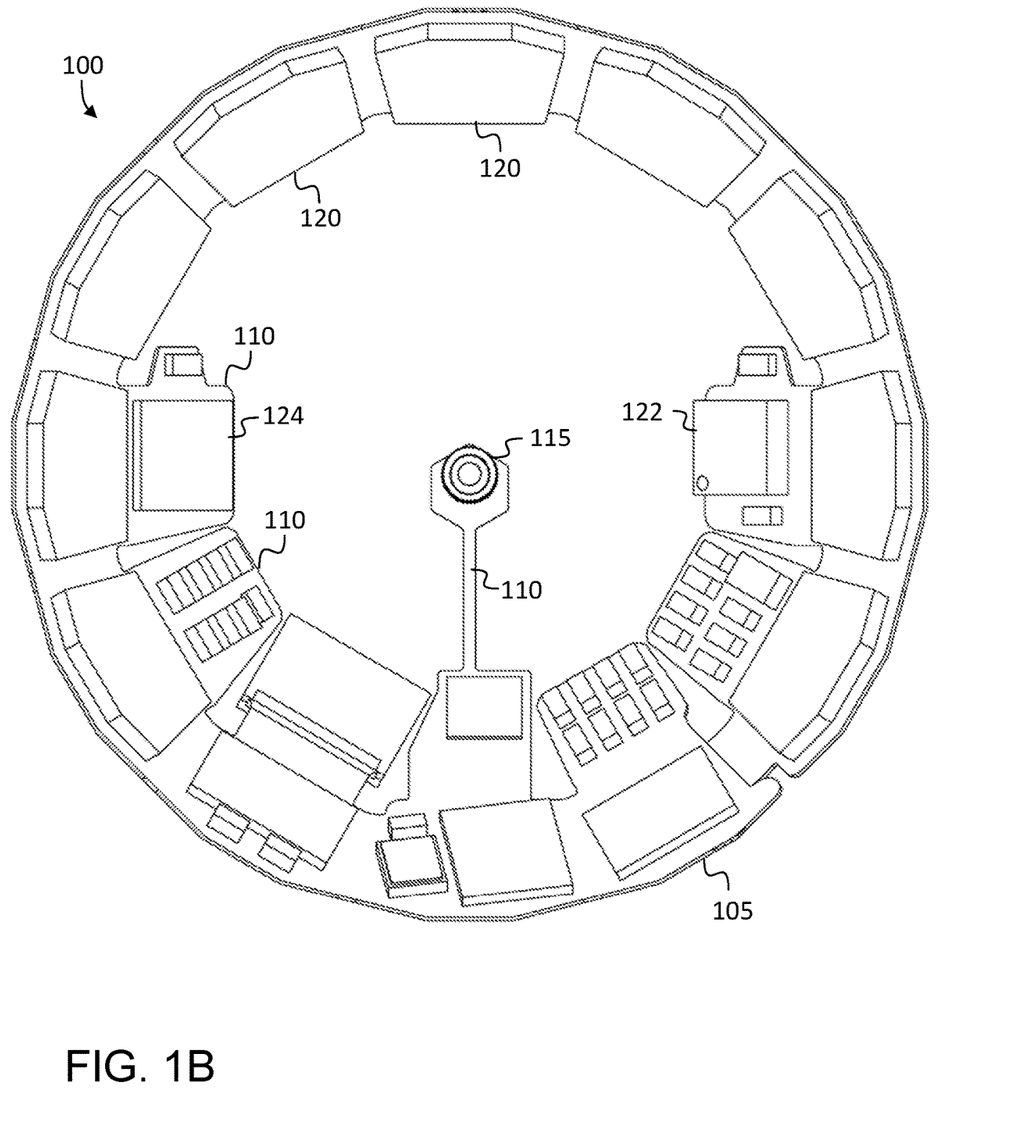
FIG. 1B is a posterior view of an electronic contact lens circuit, according to an embodiment of the present disclosure.

FIG. 1B shows a posterior view of a circuit for an electronic contact lens 100, in some embodiments. The circuit is fabricated as a flexible board 105, with a shape approximating a portion of a sphere, which may be included within the volume of a scleral contact lens. The circuit may be fabricated as an initially flat flexible board 105 (e.g., a plurality of components soldered to a flexible printed circuit) which may be coiled into the shape of a truncated cone with a plurality of extensions 110 for additional circuitry and for the display 115 (which may be a small projector (or "femtoprojector") configured to project light onto the wearer's retina). Except for the display 115 and the extension 110 supporting it, the circuit may be entirely outside of the area of the wearer's pupil. As mentioned above, the electronic contact lens 100 may also include, for example, a plurality of batteries 120, a radio (or "transceiver circuit") 122, a lens controller 124, an imager, an inertial sensor, and a power supply circuit. The antenna of the radio may be formed by a conductive trace on the flexible board 105.

Figure 2A:
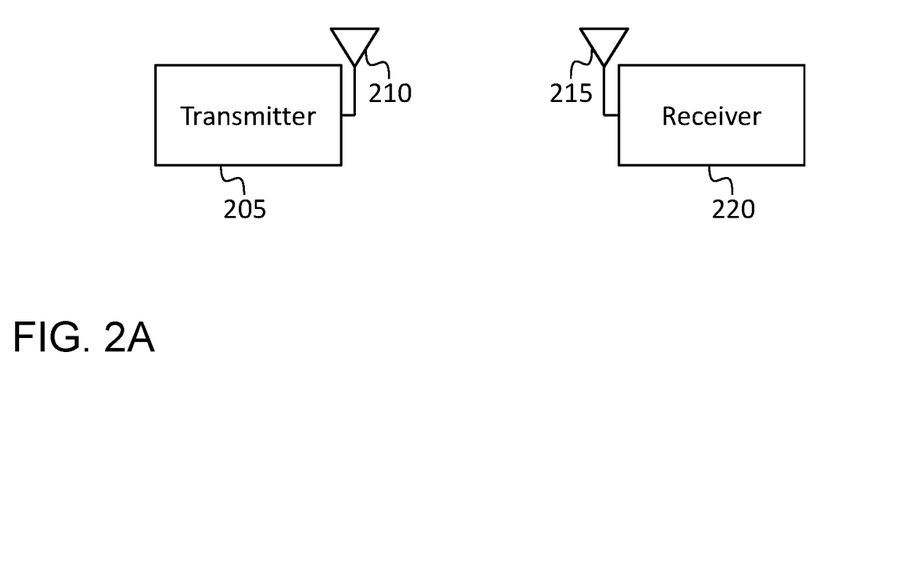
FIG. 2A is a block diagram of a transmitter and an electronic contact lens receiver, according to an embodiment of the present disclosure.

FIG. 2A shows a portion of a system for transmitting data (e.g., video data for the display 115 or control data for a sensor in the electronic contact lens 100) to an electronic contact lens. A relay accessory, which may be a user-carried or user-worn accessory, such as a mobile phone, includes a remote transmitter 205 configured to transmit data, through a transmitting antenna 210, as a modulated carrier. The carrier frequency, or "frequency of operation", may be in the sub-10 GHz range (e.g., between 3 GHz and 10 GHz, e.g., at 5 GHz). The modulated carrier is received, through a receiving antenna 215, by a receiver 220 in the electronic contact lens (e.g., in the transceiver circuit 122), and demodulated and decoded to produce a received digital data stream. In part because the relay accessory may be relatively close to the electronic contact lens 100, the received signal power level at the electronic contact lens 100 may be relatively high.

Figure 2B:
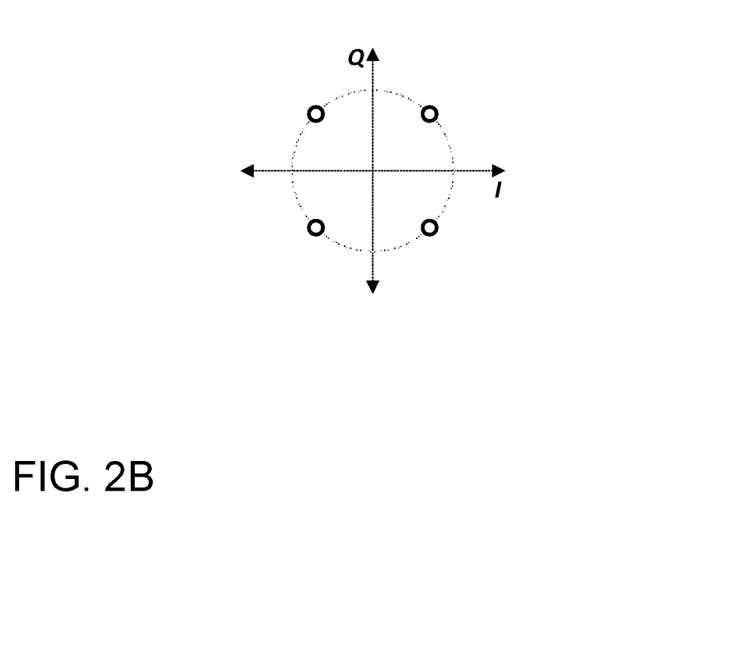
FIG. 2B is a constellation diagram, according to an embodiment of the present disclosure.

The modulating of the carrier in the remote transmitter 205 may result in a modulated carrier carrying a sequence of symbols, each symbol corresponding to a point in the complex plane. The set of such points used by the modulation scheme may be referred to as the constellation of the modulation scheme. For example, if quadrature phase shift keying (QPSK) is employed, then within each symbol the carrier may have substantially constant amplitude and a phase selected from four phases differing by 90 degrees, e.g., 45 degrees, 135 degrees, 225 degrees, and 315 degrees, as shown in the constellation diagram of FIG. 2B. In some embodiments, a modulation scheme other than QPSK, e.g., binary phase shift keying (BPSK), or quadrature amplitude modulation (QAM), e.g., 16-QAM, 64-QAM, or the like, may be used.

Figure 2C:
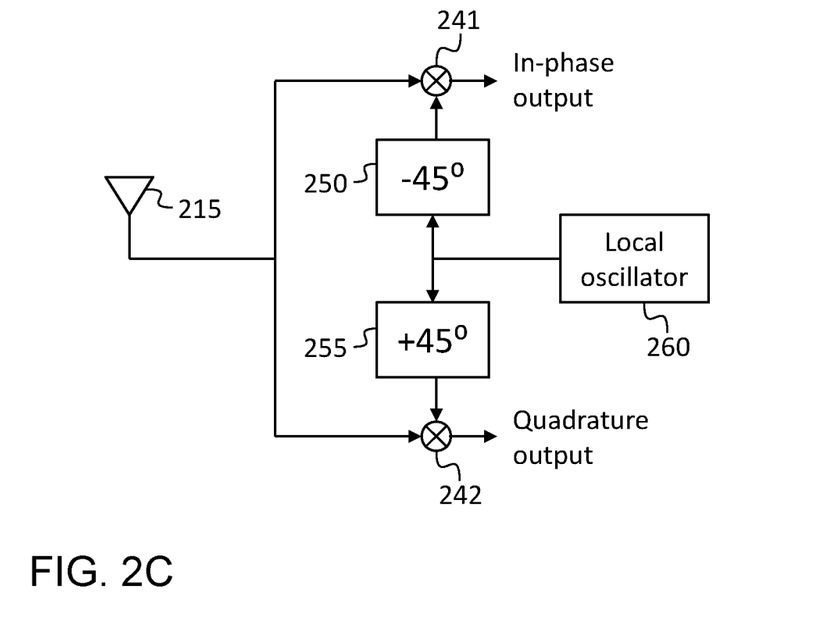
FIG. 2C is a block diagram of an antenna connected to a quadrature demodulator, according to an embodiment of the present disclosure.

Referring to FIG. 2C, such a signal (e.g., a QPSK signal) may be demodulated using a quadrature demodulator, which may include a first mixer 241, for mixing the received signal with a first local oscillator (LO) signal (which may be referred to as an in-phase local oscillator signal), and a second mixer 242, for mixing the received signal with a second local oscillator signal (which may be referred to as a quadrature local oscillator signal, and which leads or lags the in-phase local oscillator signal by 90 degrees). The RF inputs of both mixers may be fed by the signal received from the antenna 215 (e.g., through a low noise amplifier (LNA) not shown). In the embodiment of FIG. 2C, the first and second local oscillator signals are generated by respectively retarding (using a retarding 45-degree phase shifter 250) and advancing (using an advancing 45-degree phase shifter 255) the phase of the signal from a local oscillator 260. In this circuit the outputs of the first mixer 241 and the second mixer 242 may correspond to an in-phase component and a quadrature phase component, respectively, of the modulated carrier.

As used herein, the terms "in-phase" and "quadrature" are used only to distinguish signals corresponding to two substantially orthogonal phases of the carrier or of a local oscillator signal. If a first phase of the carrier differs from a second phase of the carrier by substantially 90 degrees, then (i) a signal corresponding to the first phase may be referred to as the in-phase signal and a signal corresponding to the second phase may be referred to as the quadrature signal, or (ii) a signal corresponding to the first phase may be referred to as the quadrature signal and a signal corresponding to the second phase may be referred to as the in-phase signal.

Figure 2D:
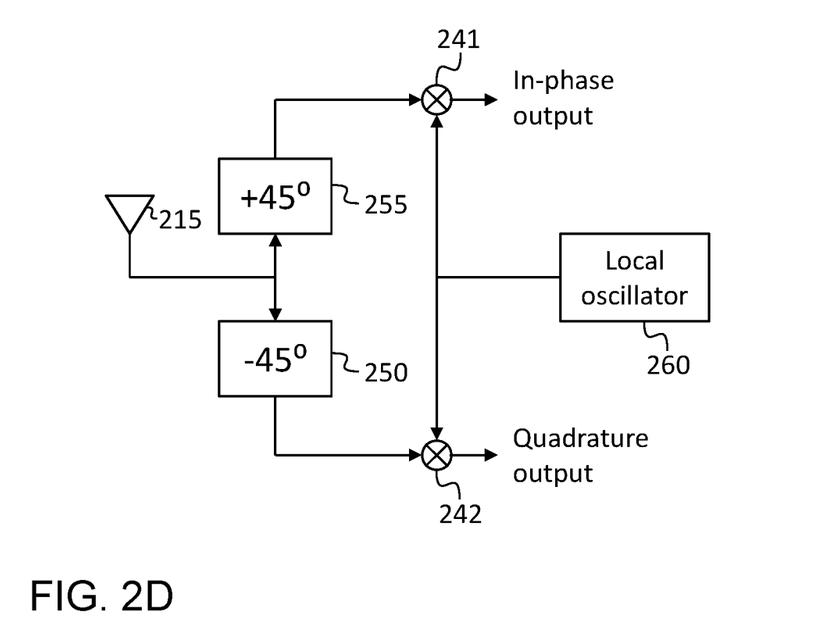
FIG. 2D is a block diagram of an antenna connected to a quadrature demodulator, according to an embodiment of the present disclosure.

The signal at the output of the first mixer 241 may be the in-phase component of the signal and the signal at the output of the second mixer 242 may be the quadrature component of the signal. As such, the circuit of FIG. 2C (and the circuit of FIG. 2D, discussed below) may have the effect of projecting the received signal into an in-phase component and a quadrature component. Moreover, the amplitude mismatch in the in-phase and quadrature components of the signals at the outputs of the first mixer 241 and the second mixer 242 may be substantially zero. As used herein, an "amplitude mismatch" is a mismatch in amplitude in the signals at the outputs of the first mixer 241 and the second mixer 242, when the magnitude of the in-phase and quadrature components are the same in the RF signal. From the in-phase and quadrature components of the signal, the receiver may infer which constellation point any received symbol represents. The components into which the RF signal is projected need not be perfectly orthogonal and may be separated by an angle different from 90 degrees if the angle is sufficient to make possible the resolving of the two independent components of the RF signal. A small loss of signal to noise ratio (SNR) may result if the components are slightly non-orthogonal, and a significant reduction in SNR may result if the phase angles of the components are nearly the same. Similarly, an amplitude mismatch may cause a reduction in SNR. The resulting signal to noise ratio due to IQ mismatch may be given by $$SNR \approx 10\log_{10}\left(\frac{4}{\Delta A^2 + \Delta\phi^2}\right),$$

where $\Delta\phi$ is the deviation from a perfect 90 degrees and $\Delta A$ is the amplitude mismatch.

As used herein "substantially orthogonal" phases differ by at least 70 degrees, and "independent" phases differ by at least 20 degrees. As used herein, the amount by which two phase angles $\phi_1$ and $\phi_2$ (each of the two phase angles being between 0 and 360 degrees) "differ" is the minimum of the magnitude (i.e., the minimum of the absolute value) of a difference between (i) a phase angle selected from the set $\{\phi_1, \phi_1+180 \text{ degrees}, \phi_1-180 \text{ degrees}\}$ and (ii) a phase angle selected from the set $\{\phi_2, \phi_2+180 \text{ degrees}, \phi_2-180 \text{ degrees}\}$. As such, for example, phase angles of 359 degrees and 2 degrees differ by 3 degrees, phase angles of 179 degrees and 2 degrees differ by 3 degrees, and phase angles of 179 degrees and 357 degrees differ by 2 degrees.

The mixer port fed by the local oscillator signal may be referred to as the LO input, and the other input may be referred to as the radio frequency (RF) input. The output of the mixer may be referred to as the intermediate frequency (IF) port (or "IF output") of the mixer. The term "RF" is used herein to distinguish high frequency signals from intermediate frequency (IF) and baseband signals; as such, it includes signals at microwave frequencies (e.g., sub-10 GHz signals) and signals at or near the carrier frequency.

The 45-degree phase shifters 250, 255 may attenuate the signal of the local oscillator 260; the local oscillator 260 may therefore generate a correspondingly higher power output signal, but doing so may result in an increase in DC power consumption. Other approaches to generating two phases of a local oscillator signal, such as the use of frequency dividers (e.g., with a local oscillator at twice the frequency of operation), or the use of quadrature oscillators, may also be costly in terms of DC power consumption. As such, in some embodiments two phases of the signal received from the antenna 215 are instead mixed with a single phase of the local oscillator 260, as shown in FIG. 2D. The signal from the antenna 215 is (i) advanced, by an advancing 45-degree phase shifter 255 and fed to the RF input of the first mixer 241 and (ii) retarded, by a retarding 45-degree phase shifter 250 and fed to the RF input of the second mixer 242. In the configuration of FIG. 2D, the relative phases between the RF signal and the LO signal at the first mixer 241 and at the second mixer 242 may be the same as in the configuration of FIG. 2C (and, as in the embodiment of FIG. 2C, the amplitude mismatch may be substantially zero), and the configuration of FIG. 2D may avoid the relatively high DC power consumption associated with generating two phases of the local oscillator signal. For example, the local oscillator may consume less power than a similar local oscillator operating at twice the frequency of operation. This reduction in DC power consumption may be achieved at the cost of a loss of RF signal power, which may however be acceptable when RF signal power is relatively abundant.

Figure 3A:
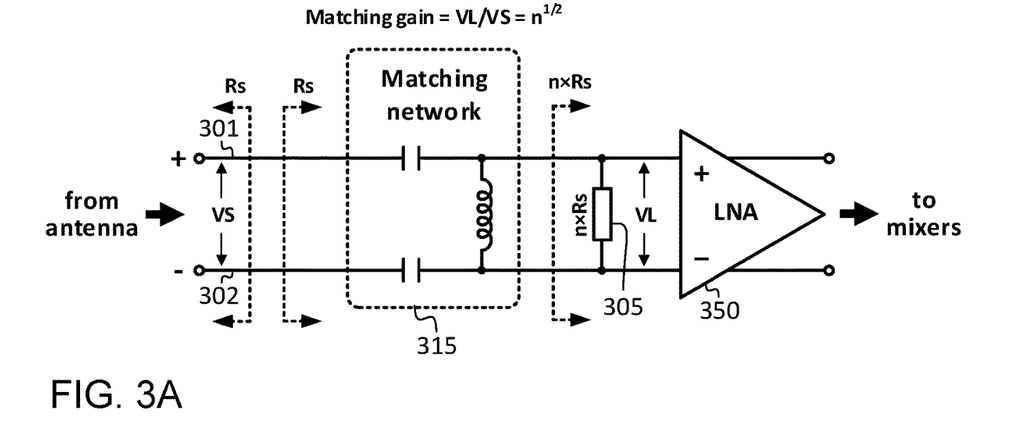
FIG. 3A is a schematic diagram of a portion of a receiver, according to an embodiment of the present disclosure.

FIG. 3A shows a front-end circuit that may be employed to amplify the signal received from the antenna (and which may be used after the antenna in the embodiment of FIG. 2C or in the embodiment of FIG. 2D). The signal received from the antenna 215 is a differential signal, including a first signal (which may be referred to as the "signal", or the "noninverted signal") on a first conductor 301 and a second signal (which may be referred to as the "inverted signal") on a second conductor 302. The output impedance Rs of the antenna 215 may be about 100 ohms. The input impedance of the low noise amplifier 350 may be significantly greater in magnitude than Rs and it may be largely capacitive (e.g., it may have a phase angle within 20% of $-\pi/2$). A shunt resistor 305 having a resistance n×Rs may be connected across the input of the low noise amplifier 350 as shown, and a matching network 315 may be employed to match the output impedance of the antenna to the input impedance of the combination of the low noise amplifier 350 and the shunt resistor 305, as shown. This circuit may result in a matching gain equal to the square root of n.

Figure 3B:
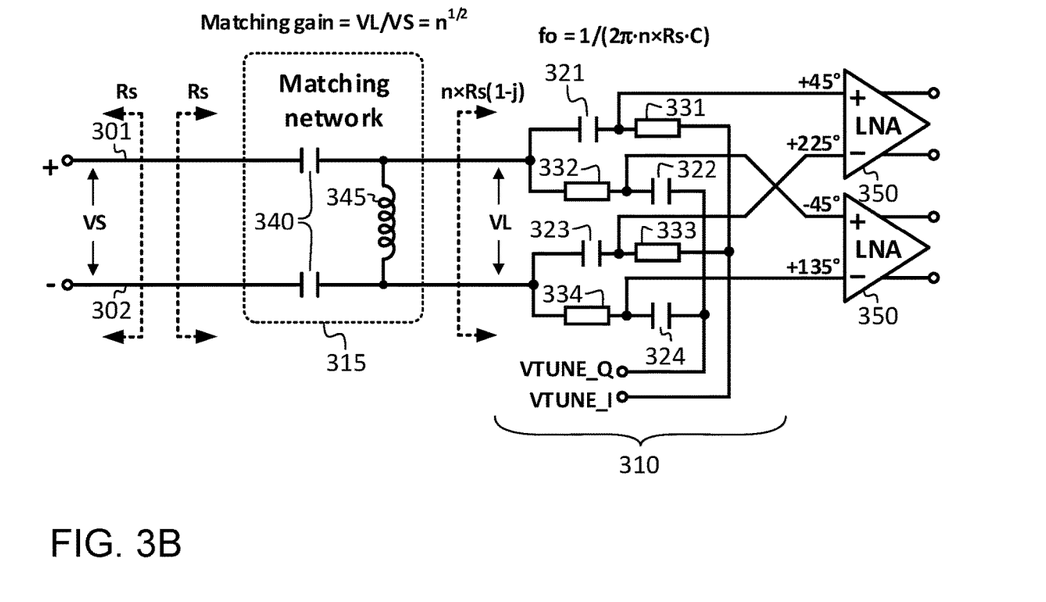
FIG. 3B is a schematic diagram of a portion of a receiver, according to an embodiment of the present disclosure.

FIG. 3B shows a circuit that includes a polyphase filter 310 (discussed in further detail below), which combines (i) the phase shifting functions of the phase shifters 250, 255 of the embodiment of FIG. 2D and (ii) the impedance-matching function of the shunt resistor of the embodiment of FIG. 3A. In FIG. 3B (as in FIG. 3A), the signal received from the antenna 215 is a differential signal including a first (noninverted) signal on a first conductor 301 and a second (inverted) signal on a second conductor 302, and the antenna 215 may have an output impedance Rs, e.g., about 100 ohms. The antenna 215 may be connected to the polyphase filter 310 (which may be a passive polyphase filter) through a matching network 315, as shown. As used herein, a "passive" filter is a circuit including a reactive circuit element, e.g., an inductor, a capacitor, or a section of transmission line having, at an end at which it is connected to the remainder of the circuit, an impedance having a non-zero imaginary part. The polyphase filter 310 may include two resistor-capacitor (RC) low-pass filters and two RC high-pass filters. For example, a first high-pass filter may include a first (series) capacitor 321 and a first (shunt) resistor 331, a first low-pass filter may include a second (series) resistor 332 and a second (shunt) capacitor 322, a second high-pass filter may include a third (series) capacitor 323 and a third (shunt) resistor 333, and a second low-pass filter may include a fourth (series) resistor 334 and a second (shunt) capacitor 324. The polyphase filter 310 may have a differential input and two differential outputs (a first differential output including the outputs of the high-pass filters, and a second differential output including the outputs of the low-pass filters).

Each of the high-pass and low-pass filters may have a corner frequency (e.g., a 3 dB frequency) substantially equal to the operating frequency (i.e., to the carrier frequency); as such, each high-pass filter may advance the phase of the signal by 45 degrees (i.e., the output may lead the input by 45 degrees) and each low-pass filter may retard the phase by 45 degrees (i.e., the output may lag the input by 45 degrees). The first high-pass filter and the first low-pass filter may generate signals having phases of +45 degrees and −45 degrees from the noninverted signal. The second high-pass filter and the second low-pass filter may generate signals having phases of +45 degrees and −45 degrees from the inverted signal, and having phases of 135 degrees and 225 degrees from the noninverted signal. A first differential low noise amplifier 350 amplifies the difference between (i) the signal at 45 degrees from the noninverted signal and (ii) the signal at 225 degrees from the noninverted signal, to generate an output at 45 degrees from the noninverted signal. A second differential low noise amplifier 350 amplifies the difference between (i) the signal at −45 degrees from the noninverted signal and (ii) the signal at 135 degrees from the noninverted signal, to generate an output at −45 degrees from the noninverted signal. As such, the signals at the outputs of the differential low noise amplifiers 350 may correspond to substantially orthogonal components of the RF signal, and (because each of the low-pass and high-pass filters attenuates the signal by substantially the same factor) the amplitude mismatch may be substantially zero. The two signals from the low noise amplifiers 350 may be fed respectively to two mixers (not shown) the LO inputs of both of which may be fed by the same phase of a local oscillator signal.

In some embodiments, the polyphase filter 310 has an insertion loss of 3 dB+/−2 dB (e.g., it may have an insertion loss of 3 dB). As used herein, the "insertion loss" of an element is the "as installed" insertion loss and is defined to be the ratio of (i) the power delivered from all of the outputs of the element to the subsequent elements in the transmission path, to (ii) the power delivered to all of the inputs of the element from the preceding elements in the transmission path.

In some embodiments the polyphase filter 310 is implemented using a different circuit, although the resistor-capacitor implementation may be significantly more compact than some alternate circuits. For example, it may be implemented with resistor-inductor high-pass and low-pass filters instead of the resistor-capacitor high-pass and low-pass filters shown in FIG. 3, or it may be constructed with filters including one or more inductors and one or more capacitors (and optionally also including one or more resistors). As used herein, a "polyphase filter" is any passive circuit having an input and two outputs that, when it receives a signal at a first frequency at the input, produces, at the two outputs two signals at the first frequency having independent (e.g., substantially orthogonal) phases. A polyphase filter may have more than one input or more than two outputs.

In some embodiments, the polyphase filter 310 is between the matching network 315 and the low noise amplifiers 350 as shown (and no amplifier is present between the matching network 315 and the polyphase filter 310). If each of the resistors 331, 332, 333, 334 has a resistance R (which may be equal to n×Rs, with n being, e.g., between 5 and 50, e.g., with n being about 14) and each of the capacitors 321, 322, 323, 324 has a capacitance C, and if the input impedance of the low noise amplifiers 350 is significantly greater than R and significantly greater than $1/(2\pi fC)$ (where f is the frequency of operation), then the input impedance of the polyphase filter may be approximately equal to $R*(1+1/(j2\pi fRC))$. At the frequency of interest, $2\pi fRC=1$ and the input differential impedance is $R*(1-j)$. The capacitive part of the impedance $j*R$ may be tuned out with one shunt inductance and the resistive part R may be matched to the antenna impedance Rs using a second shunt inductance and two series capacitors. The two shunt inductances may be combined and implemented as a single inductor 345 as shown.

In some embodiments each of the resistors 331, 332, 333, 334 may have a value of (or within 50% of) 1.4 kΩ and each of the capacitors 321, 322, 323, 324 may have a value of (or within 50% of) 0.02 pF, for a frequency of operation of about 5 GHz. Some or all of the capacitors may be implemented as metal oxide semiconductor field effect transistor (MOSFET) capacitors. In such a capacitor the source and drain of the transistor may be connected together and may function as one terminal of the capacitor; the gate may function as the other terminal. The capacitance of such a capacitor may be adjusted by adjusting a bias voltage applied across its terminals, e.g., by adjusting the bias voltages VTUNE_I and VTUNE_Q. The bias voltages VTUNE_I and VTUNE_Q may be applied to virtual grounds as shown, and the bias voltage at the other terminal of each of the capacitors may be supplied through a center tap (not shown) of the inductor 345, which is also a virtual ground. In operation, the capacitance values may be tuned, in a process that may be referred to as IQ calibration, to achieve the result that the outputs of the two low noise amplifiers 350 represent components of the carrier that are substantially 90 degrees apart (e.g., separated by a phase that is within 10% of 90 degrees) and that the amplitude mismatch is substantially zero. The IQ calibration process may involve calculating the square of the complex signal $(I+jQ)^2$ and searching for bias voltages that zero out both the real part $I^2-Q^2$ (which corresponds to the amplitude mismatch) and the imaginary part j2IQ (which corresponds to the phase mismatch, so that this term is zero when I and Q are uncorrelated, i.e., orthogonal).

The resistors 331, 332, 333, 334 may be fixed (e.g., polysilicon) resistors, or one or more of the resistors 331, 332, 333, 334 may be implemented as MOSFET resistors; a MOSFET resistor may be capable of being adjusted by adjusting a bias voltage applied across its terminals. In some such embodiments both the resistors 331, 332, 333, 334 and the capacitors 321, 322, 323, 324 are adjustable; in other embodiments one or more of the capacitors 321, 322, 323, 324 may be fixed (e.g., formed as a conductive polysilicon sheet separated from a conductive (e.g., doped) portion of the substrate by a thin oxide layer). In some embodiments, various combinations of fixed and variable capacitors and resistors may be employed, and the variable capacitors or resistors may be used to perform IQ calibration.

Figure 4:
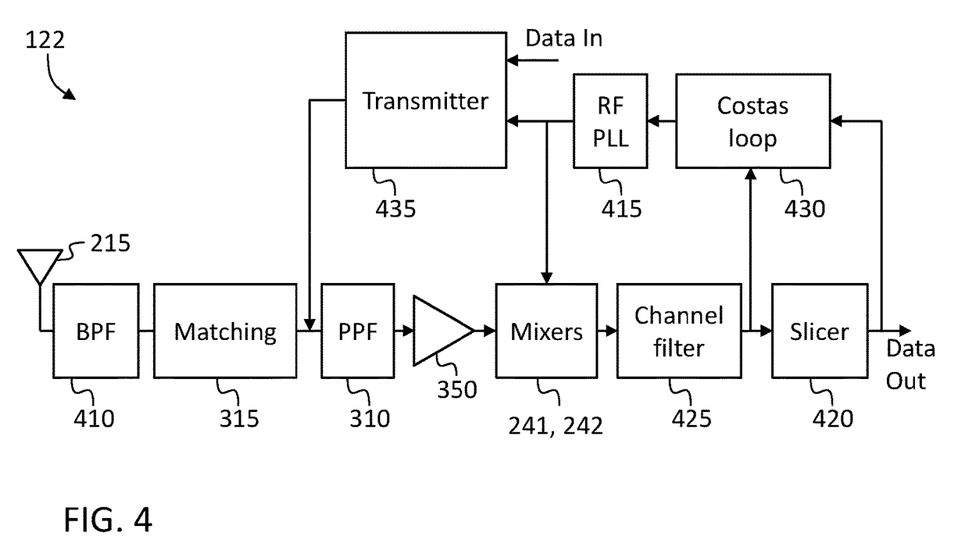
FIG. 4 is a block diagram of a portion of a circuit including a transmitter and a receiver, according to an embodiment of the present disclosure.

In some embodiments the receiver of the electronic contact lens 100 is part of a transceiver circuit 122, an example of which is shown in FIG. 4. An antenna 215 is connected through a band pass filter (BPF) 410, through a matching network 315, and through a polyphase filter 310, to one or more low noise amplifiers 350 (only one of which is shown for ease of illustration). The low noise amplifiers 350 drive the RF input of one or more mixers 241, 242 (drawn as a single block for ease of illustration), the LO inputs of which are driven by an RF phase locked loop (PLL) 415. The IF output of the mixers 241, 242 is connected to a slicer 420 through a channel filter 425; the output of the slicer 420 is a stream of digital data corresponding to the modulation of the signal received by the antenna 215. The RF phase locked loop 415 is driven by a Costas loop 430. A transmitter 435 receives a local oscillator signal from the RF phase locked loop 415 and is connected to the antenna 215 through the matching network 315 and through the band pass filter 410. The transmitter may use binary phase shift keying (which may use only one phase of the local oscillator), and in the receiver, which may generate two phases of the RF signal as mentioned above, a single phase of the local oscillator may also be sufficient. The circuit operates in transmit mode only when data are not being received; when operating in receive mode, the transmitter is disconnected from the matching network 315.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B. As used herein, when a second number is "within Y %" of a first number, it means that the second number is at least (1−Y/100) times the first number and the second number is at most (1+Y/100) times the first number.

It will be understood that when a first element is referred to as being "directly connected" or "directly coupled" to a second element, there are no intervening elements present. As used herein, when a first element is referred to as being "generally connected" to a second element, it means that the first element and the second element are connected by an electrical path that may contain arbitrary intervening elements (e.g., intervening elements connected between the first element and the second element), including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit. When a first element is referred to as being "operatively coupled" to a second element, it means that (i) in operation, the first element receives a signal from the second element (possibly through intervening elements, (which may or may not qualitatively modify the signal) or (ii) in operation, the second element receives a signal from the first element (possibly through intervening elements, (which may or may not qualitatively modify the signal).

Although exemplary embodiments of a contact lens IQ circuit have been specifically described and illustrated herein, many modifications and variations will be apparent to those skilled in the art. Accordingly, it is to be understood that a contact lens IQ circuit constructed according to principles of this disclosure may be embodied other than as specifically described herein. The invention is also defined in the following claims, and equivalents thereof.

What is claimed is:

1. An electronic contact lens comprising:
a radio antenna and radio receiver contained within the contact lens, the receiver comprising antenna impedance matching and in-phase and quadrature signal generation such that signals from the antenna are projected into in-phase and quadrature components before mixing with a local oscillator signal in the receiver; and
electronic circuits contained within the contact lens, the electronic circuits receiving data from the radio receiver;
wherein:
the in-phase and quadrature signal generation is performed by a circuit comprising a filter; and
the filter is a polyphase filter.

2. The electronic contact lens of claim 1, wherein the filter is a passive filter.

3. The electronic contact lens of claim 2, wherein the filter is a resistor-capacitor filter or a resistor-inductor filter.

4. The electronic contact lens of claim 3, wherein the filter has an insertion loss of at least 1 dB and at most 5 dB.

5. The electronic contact lens of claim 1, wherein the receiver is configured to receive a signal comprising a carrier modulated with quadrature phase shift keying modulation.

6. The electronic contact lens of claim 1, further comprising a femtoprojector within the contact lens, wherein the receiver is configured to receive a signal comprising a carrier modulated with a modulation encoding video data for the femtoprojector.

7. The electronic contact lens of claim 1, further comprising a sensor within the contact lens, wherein the receiver is configured to receive a signal comprising a carrier modulated with a modulation encoding control data for the sensor.

8. An electronic contact lens comprising:
a radio antenna and radio receiver contained within the contact lens, the receiver comprising antenna impedance matching and in-phase and quadrature signal generation such that signals from the antenna are projected into in-phase and quadrature components before mixing with a local oscillator signal in the receiver; and
electronic circuits contained within the contact lens, the electronic circuits receiving data from the radio receiver,
wherein:
the receiver is configured to receive a signal comprising a modulated carrier at a carrier frequency, and the local oscillator signal has a frequency less than 1.1 times the carrier frequency.

9. The electronic contact lens of claim 8, wherein the receiver does not include a circuit configured to operate at a frequency greater than 1.1 times the carrier frequency.

10. An electronic contact lens comprising:
a radio antenna and radio receiver contained within the contact lens, the receiver comprising antenna impedance matching and in-phase and quadrature signal generation such that signals from the antenna are projected into in-phase and quadrature components before mixing with a local oscillator signal in the receiver; and
electronic circuits contained within the contact lens, the electronic circuits receiving data from the radio receiver,
wherein:
the receiver is configured to receive a signal comprising a modulated carrier at a carrier frequency,
the receiver comprises a local oscillator circuit configured to generate the local oscillator signal, and
the local oscillator circuit is configured to consume less power than a local oscillator circuit configured to operate at twice the carrier frequency.

11. An electronic contact lens, comprising:
a receiver, within the electronic contact lens,
the receiver comprising:
an antenna, and
a polyphase filter;
the polyphase filter being configured to receive a signal from the antenna, and to produce a first signal and a second signal, the first signal and the second signal having different phases.

12. The electronic contact lens of claim 11, wherein the first signal and the second signal have substantially orthogonal phases.

13. The electronic contact lens of claim 11, wherein the polyphase filter has an insertion loss of at least 1 dB and at most 5 dB.

14. The electronic contact lens of claim 11, wherein:
the receiver is configured to operate in a frequency band including an operating frequency; and
the polyphase filter comprises a first filter,
the first filter comprising:
a resistor, and
a capacitor or an inductor,
the first filter having a corner frequency within a factor of 5 of the operating frequency.

15. The electronic contact lens of claim 14, wherein the receiver further comprises a matching network, the matching network being connected between the antenna and the polyphase filter.

16. The electronic contact lens of claim 15, wherein:
the receiver further comprises an amplifier connected to the polyphase filter, the amplifier having an input impedance having:
a phase angle within 20% of $-\pi/2$, and
a magnitude at least twice as great as the resistance of the resistor; and
the combination of the matching network and the polyphase filter has a matching gain within 20% of the square root of the ratio of:
the resistance of the resistor, and
the output impedance of the antenna.

17. The electronic contact lens of claim 15, wherein the matching network comprises:
a shunt inductor, and
a series capacitor.

18. The electronic contact lens of claim 11, wherein:
the polyphase filter has an input, a first output, and a second output;
the input of the polyphase filter is a differential input;
the first output of the polyphase filter is a differential output; and
the second output of the polyphase filter is a differential output.

19. The electronic contact lens of claim 18, further comprising a first differential amplifier connected to the first output of the polyphase filter.

20. The electronic contact lens of claim 11, wherein the receiver does not include an amplifier connected between the antenna and the polyphase filter.

* * * * *